United States Patent [19]
Hayashi et al.

[11] Patent Number: 5,932,808
[45] Date of Patent: Aug. 3, 1999

[54] PRESSURE SENSOR MODULE HAVING DUAL INSULATING SUBSTRATES ON THE PRESSURE SENSING AND NON-PRESSURE SENSING SIDES

[75] Inventors: Kazutaka Hayashi; Satoshi Nakao; Kiyoshi Tanaka; Hideki Tanigami; Hideto Ishikawa; Yoshimitsu Motoki, all of Kami-niikawagun, Japan

[73] Assignee: Hokuriku Electric Industry Co., Ltd., Toyama, Japan

[21] Appl. No.: 08/945,847

[22] PCT Filed: Mar. 7, 1997

[86] PCT No.: PCT/JP97/00717

§ 371 Date: Nov. 6, 1997

§ 102(e) Date: Nov. 6, 1997

[87] PCT Pub. No.: WO97/33146

PCT Pub. Date: Sep. 12, 1997

[30] Foreign Application Priority Data

| Mar. 7, 1996 | [JP] | Japan | 8-050052 |
| Nov. 22, 1996 | [JP] | Japan | 8-312222 |
| Dec. 26, 1996 | [JP] | Japan | 8-347552 |

[51] Int. Cl.$^6$ ........................................ G01L 9/12
[52] U.S. Cl. ................................. 73/724; 73/718
[58] Field of Search ................... 73/718, 724, 706, 73/756; 3613/283.1, 283.2, 283.3, 283.4

[56] References Cited

U.S. PATENT DOCUMENTS

| 5,329,819 | 7/1994 | Park et al. | 73/724 |
| 5,343,757 | 9/1994 | Tate | 73/724 |

*Primary Examiner*—William Oen
*Attorney, Agent, or Firm*—Pearne, Gordon, McCoy & Granger LLP

[57] ABSTRACT

The present invention provides a pressure sensor module which is capable of restraining application of a pressure of increased magnitude to a connector, reducing the number of parts therefor and compacting a structure thereof. A connector body (3a) is provided on a base section thereof with a flange (3g). An annular support (4) which is made of a material hard to be deformed under a high pressure as compared with the connector body (3a) is provided with an annular engagement recess (4b). The annular support (4) is fitted on the connector body (3a) to engage the flange (3g) with the annular engagement recess (4b). The annular support (4) is contacted on one end surface (4a) thereof with a pressure non-sensing side insulating substrate (5a) of a pressure sensing element (5) outside the base section of the connector body (3a). A housing (7) includes a cylindrical engagement section (7g1), which is curled so as to surround an outer edge of an end surface (4c) of the annular support (4), to thereby accomplish engagement between the housing (7) and the annular support (4).

19 Claims, 7 Drawing Sheets

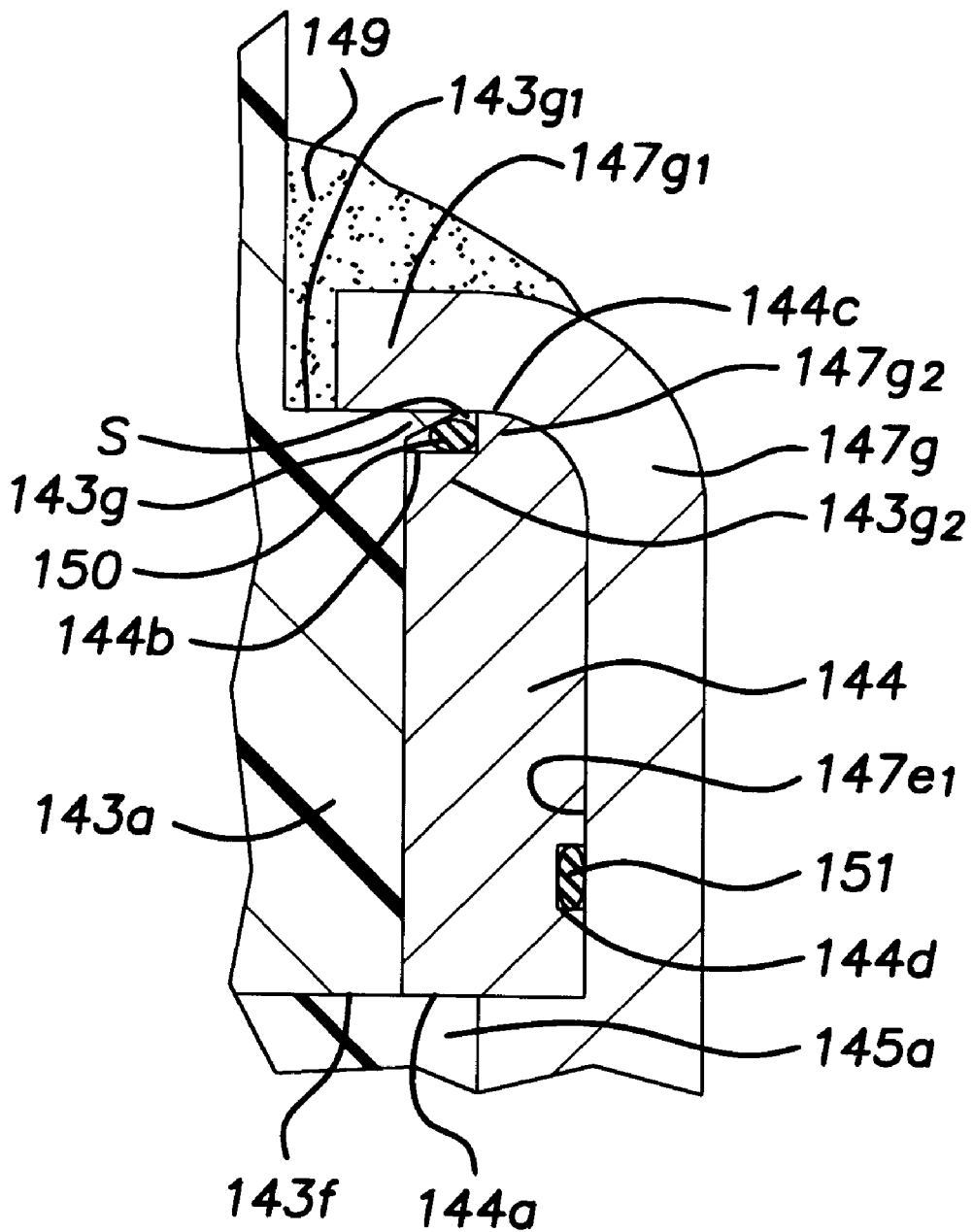

PRESSURE SENSOR MODULE HAVING DUAL INSULATING SUBSTRATES ON THE PRESSURE SENSING AND NON-PRESSURE SENSING SIDES

TECHNICAL FIELD

This invention relates to a pressure sensor module including a pressure sensing element of the capacitance type.

BACKGROUND ART

One of pressure sensor modules suitable for use for a gas pressure detecting unit or the like which have been conventionally known in the art is so constructed that a pressure sensing element, a circuit board, a part of a connector and the like are arranged in a housing. The pressure sensing element is a sensor element constituted by a sensor element of the capacitance type. The pressure sensing element is so constructed that a pair of insulating substrates (a diaphragm substrate and a base substrate) such as ceramic plates of which at least one is movable or flexible in response to a pressure applied thereto are provided on surfaces thereof opposite to each other with facing electrodes, respectively, resulting in a variation in pressure being detected based or depending on a variation in capacity between the facing electrodes. The connector is constructed in such a manner that terminal members made of metal are fixed on a connector body formed of an insulating material consisting of synthetic resin. Such a conventional pressure sensor module is disclosed in Japanese Patent Application Laid-Open Publication No. 19527/1988 or U.S. Pat. No. 4,774,626. In the pressure sensor module disclosed, a flange is integrally formed on a lower end of a connector body. The flange of the connector body is received in a housing while being laminatedly supported on a pressure sensing element through a support ring and then is subject to curling (caulking), resulting in being wrapped in an end of the housing. Unfortunately, an insulating material for the flange is reduced in pressure resisting strength or pressure resistance. Thus, mounting of the connector by wrapping the flange in the end of the housing by caulking possibly causes detachment of the connector from the housing or breakage of the connector, when force of increased magnitude is continuously applied to the flange through the pressure sensing element and support ring. In view of the fact, Japanese Patent Application Laid-Open Publication No. 190731/1990 or U.S. Pat. No. 4,888,662 proposes a pressure sensor module constructed so as to solve such a problem. More particularly, in the pressure sensor module proposed, a support member (a support substrate) made of metal is arranged between a pressure sensing element and a connector to mechanically insulate both from each other for the purpose of preventing force from being applied to a connector body through the pressure sensing element.

However, such arrangement of the support substrate made of metal between the pressure sensing element and the connector causes a thickness or height of the whole pressure sensor module to be increased by an amount corresponding to a thickness of the support substrate, to thereby fail to compact the pressure sensor module. Also, the support substrate made of metal causes static electricity charged on an outside of the pressure sensor module through the support substrate to enter a circuit board through the support substrate, leading to generation of noise and, in the worst case, breakage of electronic elements. In particular, the latter techniques, when the support substrate is deteriorated in working or processing accuracy and more particularly a contact surface of the support substrate with the pressure sensing element is worked or processed in deteriorated accuracy, cause spot contact or partial contact to occur between the support substrate and the pressure sensing element, leading to local application of force to the pressure sensing element, resulting in the pressure sensing element being possibly broken.

Accordingly, it is an object of the present invention to provide a pressure sensor module which is capable of restraining force of large magnitude from being applied to a connector and reducing a height or thickness of the module, to thereby accomplish compaction thereof.

It is another object of the present invention to provide a pressure sensor module which is capable of restraining both application of force of large magnitude to a connector and intrusion of static electricity into a circuit board.

It is a further object of the present invention to provide a pressure sensor module which is capable of restraining application of force of large magnitude to a connector and preventing breakage of a pressure sensing element due to local application of force to the pressure sensing element.

It is still another object of the present invention to provide a pressure sensor module which is capable of minimizing damage to a surface of a coupling or connection section of a housing due to curling of the connection section.

It is yet another object of the present invention to provide a pressure sensor module which is capable of preventing occurrence of cracks in a flange of a connector body.

It is a still further object of the present invention to provide a pressure sensor module which is capable of readily preventing intrusion of water thereinto through a gap between a connection section of a housing and a connector body.

It is a yet further object of the present invention to provide a pressure sensor module which is capable of exhibiting increased reliability as compared with the prior art.

DISCLOSURE OF INVENTION

In accordance with the present invention, a pressure sensor module is provided. The pressure senor module includes a pressure sensing element, a connector and a housing made of metal. The pressure sensing element is of the capacitance type wherein a pressure sensing side insulating substrate (a diaphragm substrate) and a pressure non-sensing side insulating substrate (a base substrate) are respectively provided on surfaces thereof opposite to each other with facing electrodes, so that a variation in pressure may be detected depending or based on a variation in capacity between the facing electrodes. The connector includes a plurality of terminal members to which terminals of a mated connector or a connector mated therewith are connected, and a connector body made of an insulating material and formed at a base section thereof with a board or substrate receiving recess for receiving a circuit board therein. The pressure sensor module of the present invention particularly has an annular support incorporated therein which is made of a material increased in mechanical strength as compared with the connector body and fitted on the base section of the connector body, resulting in one end surface thereof being contacted with the pressure non-sensing side insulating substrate outside the base section of the connector body. The housing is constructed so as to include a receiving chamber for receiving the pressure sensing element, the base section of the connector body and the annular support therein, a high-pressure fluid feed passage arranged so as to communicate with the receiving chamber to feed therethrough fluid to be measured or measured fluid which acts a pressure on a pressure sensing surface of the pressure sensing side insulating substrate, and an engagement section engaged with the annular support. The connector body has an end surface arranged so as to surround an opening of the substrate receiving recess and contacted with the pressure non-sensing side insulating substrate. Also, the base section of the connector body, the annular support and the engagement section of the housing are so constructed that a first engagement structure for preventing the connector body from being detached from the annular support in a direction away from the pressure non-sensing side insulating substrate and a second engagement structure for preventing the annular support from being separated from the pressure non-sensing side insulating substrate may be provided.

In the present invention, the pressure sensing element is contacted with the base section of the connector body to permit the substrate receiving recess of the connector to surround the circuit board. The annular support which is made of a material hard to be deformed under a high pressure as compared with the connector body is fitted on the connector body, so that the annular support is contacted on one end surface thereof with the pressure non-sensing side insulating substrate. Then, the annular support is engaged with the engagement section of the housing to fix the connector to the housing. Such construction, when an increased pressure is applied to the pressure sensing element, causes force of large magnitude to be applied to the annular support and the engagement of the housing, but effectively restrains application of increased force to the connector body. This prevents detachment of the connector and breakage of the connector due to application of a high pressure thereto. Also, the present invention eliminates a necessity of arrangement of any metal support substrate between the pressure sensing element and the connector as in the prior art, resulting in a thickness or height of the whole pressure sensor module being reduced by an amount corresponding to the elimination. Further, the present invention permits the annular support to be contacted with the pressure sensing element at a position spaced from a conductive section of the pressure sensing element and the circuit board, to thereby positively prevent flowing of static electricity into the circuit board through the support substrate as seen in the prior art. When the pressure sensing element is supported by the support substrate, annular supporting of only the outer periphery of the pressure non-sensing side insulating substrate of the pressure sensing element rather than whole supporting of the pressure non-sensing side insulating substrate is preferable. This is for the reason that even when the annular support or pressure sensing element is varied in working or processing accuracy, annular supporting of only the outer periphery of the pressure non-sensing side insulating substrate restrains the variation from adversely affecting electrical characteristics of the pressure sensor module as compared with whole supporting of the pressure non-sensing side insulating substrate. Also, it prevents breakage of the pressure nonsensing side insulating substrate even when a pressure applied to the pressure sensing side insulating substrate is increased.

BRIEF DESCRIPTION OF DRAWINGS

FIG. 10 is a fragmentary enlarged sectional view showing a structure of a still further embodiment of a pressure sensor module according to the present invention.

BEST MODE OF CARRYING OUT INVENTION

Now, the present invention will be described hereinafter with reference to the accompanying drawings.

Figure 1:
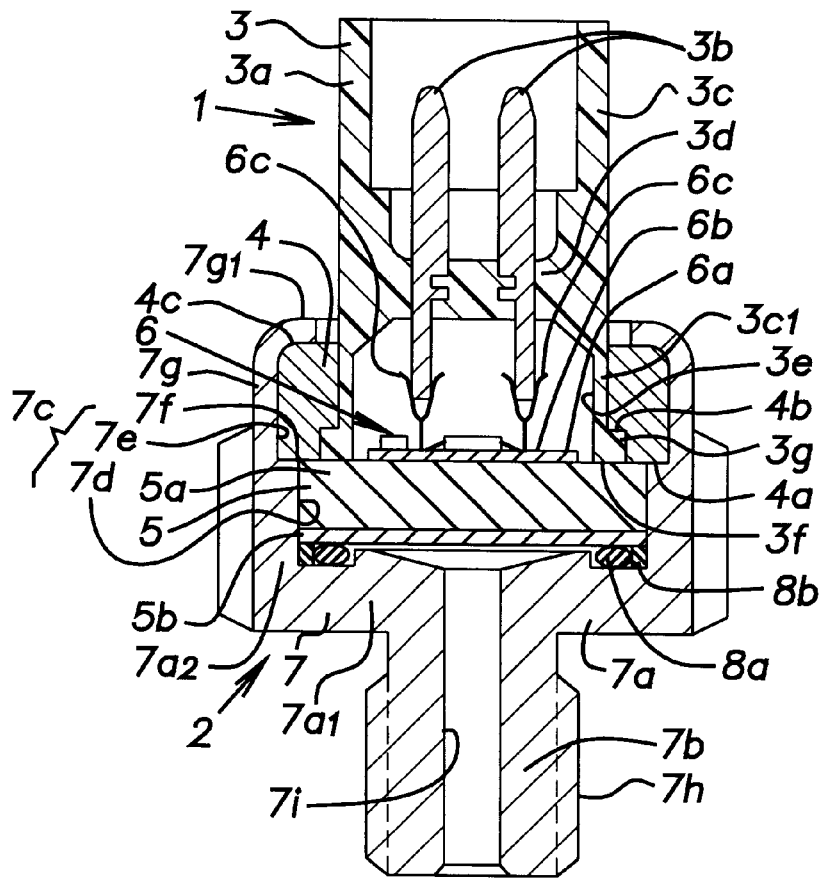
FIG. 1 is a sectional view showing a structure of an embodiment of a pressure sensor module according to the present invention.

Referring first to FIG. 1, a first embodiment of a pressure sensor module according to the present invention is illustrated. A pressure sensor module of the illustrated embodiment, as shown in FIG. 1, is so constructed that a connector assembly 1 is fixed on a pressure sensor assembly 2. The connector assembly 1 includes an annular support 4 and a connector 3 fitted in the annular support 4. The pressure sensor assembly 2 is constituted by a pressure sensing element 5, a circuit board 6 and a housing 7.

The connector 3 includes a connector body 3a and three terminal members 3b (of which one is not shown for the sake of brevity) insert-molded in the connector body 3a. The connector body 3a is constituted by a cylinder 3c and a terminal member fixing section 3d on which the terminal members 3b are fixed. The connector body 3a is integrally formed of synthetic resin (an insulating resin material) such as PBT (polybutylene terephthalate), PPS (polyphenylene sulfide) or the like which is readily deformed under a high pressure as compared with a material (aluminum alloy, iron) for the housing 7 described hereinafter. The cylinder 3c has a base section 3c1 (a section thereof facing the housing 7) formed with a substrate receiving recess 3e for surrounding the circuit board 6. The connector body 3a has an end surface 3f arranged so as to surround an opening of the substrate receiving recess 3e. The end surface 3f of the connector body 3a is arranged so as to be contacted with a surface of a pressure non-sensing side insulating substrate of the pressure sensing element 5. The cylinder 3c is integrally provided on an outer periphery thereof facing the end surface 3f of the base section 3c1 thereof with an annular projection or flange 3g in a manner to project outwardly in a radial direction thereof. The terminal members 3b each are electrically connected at one end thereof to the circuit board 6 and at the other end thereof to a terminal of a mated connector (not shown) or a connector mated therewith.

The annular support 4 has one end surface 4a arranged so as to be contacted with the pressure non-sensing side insulating substrate of the pressure sensing element 5 outside the base section 3c1 of the connector body 3a and surround the outer periphery of the base section 3c1 of the connector body 3a. The annular support 4 is made of a metal material such as aluminum alloy, iron alloy or the like which is hard to be deformed under an increased pressure as compared with the material (PBT) for the connector body 3a. The annular support 4 is formed with an opening on a side of the end surface 4a thereof, which opening is formed with an engagement recess or annular engagement recess 4b in which the flange 3g of the connector 3 is engagedly fitted. An engagement structure (a first engagement structure) provided by fit engagement between the annular engagement recess 4b and the flange 3g permits the annular support 4 to be mounted on the connector body 3a while preventing detachment of the connector body 3a from the annular support 4. Such construction permits removal or detachment of the connector body 3a from the annular support 4 to be prevented by only fit engagement therebetween, to thereby facilitate assembling of the pressure sensor module. In the illustrated embodiment, the projection of the connector 3 is provided by the flange 3g. Alternatively, it may be constituted by a plurality of projections arranged in a manner to be radially projected.

Figure 2:
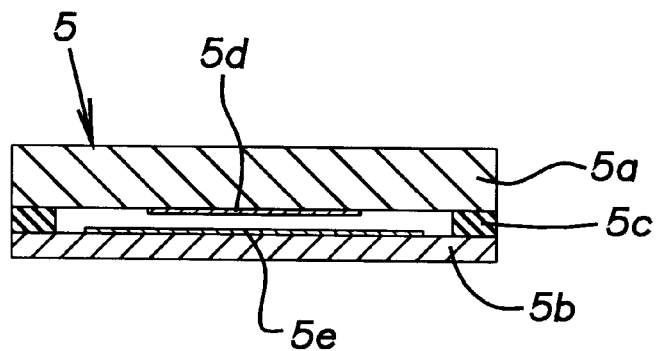
FIG. 2 is a sectional view showing a pressure sensing element incorporated in the pressure sensor module shown in FIG. 1.

The pressure sensing element 5 for the pressure sensor assembly 2 may be constituted by any suitable conventional pressure sensing element constructed in a manner known in the art. For example, it, as shown in FIG. 2, may be so constructed that a base substrate or pressure non-sensing side insulating substrate 5a made of a ceramic material and a pressure sensing side insulating substrate 5b made of a ceramic material and constituting a diaphragm substrate are sealedly joined to each other through an annular glass layer 5c. The pressure no-nonsensing side insulating substrate 5a and pressure sensing side insulating substrate 5b are formed on surfaces thereof opposite to each other with facing electrodes 5d and 5e, respectively. The facing electrodes 5d and 5e are connected through conductive connection means (not shown) to circuit patterns of the circuit board 6, respectively. The pressure sensing element 5 is constructed so as to detect a variation in pressure depending or based on a variation in capacity between the facing electrodes 5d and 5e. The facing electrode arranged on the pressure non-sensing side insulating substrate 5a may be constructed of two electrodes or a main capacitive electrode and a reference capacitive electrode. In this instance, the facing electrode provided on the pressure sensing side insulating substrate 5b may be constituted by two electrodes arranged opposite to the main capacitive electrode and reference capacitive electrode of the A pressure non-sensing side insulating substrate 5a, respectively. Alternatively, it may be constituted by a single electrode commonly opposite to both capacitive electrodes.

The circuit board 6 is arranged on the pressure non-sensing side insulating substrate 5a of the pressure sensing element 5 and includes a circuit board or insulating substrate 6a, as well as a signal conversion circuit 6b and three connections 6c arranged on the insulating substrate 6a. The connections 6c each include a female terminal structure in which one end of each of the terminal members 3b of the connector 3 is fitted. The pressure non-sensing side insulating substrate 5a may be formed on an outer surface thereof with a circuit pattern which exhibits a function like the circuit board 6. In this instance, a flexible substrate may be used for electrically connecting the terminal members 3b of the connector 3 and the circuit pattern formed on the outer surface of the pressure non-sensing side insulating substrate 5a to each other.

The housing 7 includes a housing body 7a and a high-pressure fluid feed cylinder 7b which are formed integrally with each other. The housing 7 may be made of metal such as aluminum alloy, iron alloy or the like. The housing body 7a has an outer surface plated. The housing body 7a is formed into a cylindrical shape, resulting in including a bottom wall 7a1 and a peripheral wall 7a2 and having a receiving chamber 7c provided therein. The receiving chamber 7c includes a pressure sensing element receiving section 7d in which the pressure sensing element 5 is received and a support receiving section 7e which is provided in a manner to be contiguous to the sensing element receiving section 7d and in which the annular support 4, the circuit board 6 and the base section of the connector body 3a are received. The support receiving section 7e is formed into a diameter larger than the pressure sensing element receiving section 7d, so that a support step 7f for supporting an outer edge of the one end surface 4a of the annular support 4 is defined between the pressure sensing element receiving section 7d and the support receiving section 7e. In the illustrated embodiment, between the pressure sensing side insulating substrate 5b of the pressure sensing element 5 and the bottom surface (or bottom wall 7a1) of the pressure sensing element receiving section 7d are arranged an O-ring 8a made of rubber and a backup ring 8b. The backup ring 8b is arranged outside the O-ring 8a so as to be concentric therewith. The backup ring 8b is made of Teflon (registered trademark). The bottom wall 7a1 of the housing body 7a is formed thereon with an annular groove in which the O-ring 8a and backup ring 8b are received. The O-ring 8a and backup ring 8b cooperate with each other to form a chamber which acts a pressure on the pressure sensing side insulating substrate 5b.

The housing body 7a includes a wall 7g which constitutes a part of the peripheral wall 7a2 of the housing body 7a which defines the support receiving section 7e therein. The wall 7g is arranged so as to extend beyond an upper end surface 4c of the annular support 4 received in the support receiving section 7e. An extension of the wall 7g which is a portion of the wall 7g extending beyond the annular support 4 provides a cylindrical engagement section 7g1. The engagement section 7g1 of a cylindrical shape is subject to curling so as to surround an outer edge of the end surface 4c of the annular support 4, so that engagement between the engagement section 7g1 curled and the end surface 4c of the annular support 4 provides a second engagement structure for mounting the connector assembly 1 on the pressure sensor assembly 2, to thereby prevent the annular support 4 from being detached from the housing 7. The high-pressure fluid feed cylinder 7b is formed into a cylindrical configuration having a diameter smaller than that of the housing body 7a and provided on an outer periphery thereof with threads 7h. The high-pressure fluid feed cylinder 7b is formed therein with a high-pressure fluid feed passage 7i. The high-pressure fluid feed passage 7i is arranged so as to communicate with the receiving chamber 7c, resulting in fluid to be measured or measured fluid which is high-pressure fluid acting a pressure on the pressure sensing side insulating substrate 5b of the pressure sensing element 5 being fed therethrough.

The present invention is so constructed that the annular support 4 made of a material hard to be deformed under a high pressure as compared with the connector body 3a is engaged with the connector body 3a through the first engagement structure, to thereby be kept from being detached therefrom and also the annular support 4 is engaged with the housing 7 through the second engagement structure to mount the connector 3 on the housing 7. Such construction, when the high-pressure fluid fed through the high-pressure fluid feed passage 7i applies a high pressure on the pressure sensing element 5, permits the pressure to be transmitted to the annular support, to thereby ultimately act on the end surface 4c of the annular support 4 and the engagement section 7g1 of the housing 7. Likewise, force transmitted to the connector body 3a is permitted to act on the end surface 4c and engagement section 7g1. Thus, force of significantly increased magnitude is kept from being applied to the engagement between the annular support 4 and the connector body 3a. This prevents detachment of the connector 3 and breakage thereof due to application of an increased pressure thereto.

The above-described construction of the illustrated embodiment eliminates a necessity of arrangement of any metal support substrate between the connector 3 and the pressure sensing element 5, so that a thickness or height of the whole pressure sensor module may be reduced by an amount corresponding to the elimination. Also, the circuit board 6 is surrounded by the base section 3c1 of the connector body 3a, to thereby effectively prevent static electricity from entering the circuit board 6 through the annular support 4. Further, the annular support 4 is kept contacted with the outer edge of the pressure sensing element 5 rather than a central portion thereof, so that force is prevented from being locally concentratedly applied to the pressure sensing element 5 (in particular, the pressure non-sensing side insulating substrate 5a) even when any warpage occurs in the pressure sensing element 5 (in particularly, the pressure non-sensing side insulating substrate 5a). Thus, breakage of the pressure sensing element 5 is positively prevented even when accuracy in working or processing of the pressure sensing element 5, particularly, the pressure non-sensing side insulating substrate 5a is somewhat deteriorated.

Figure 3:
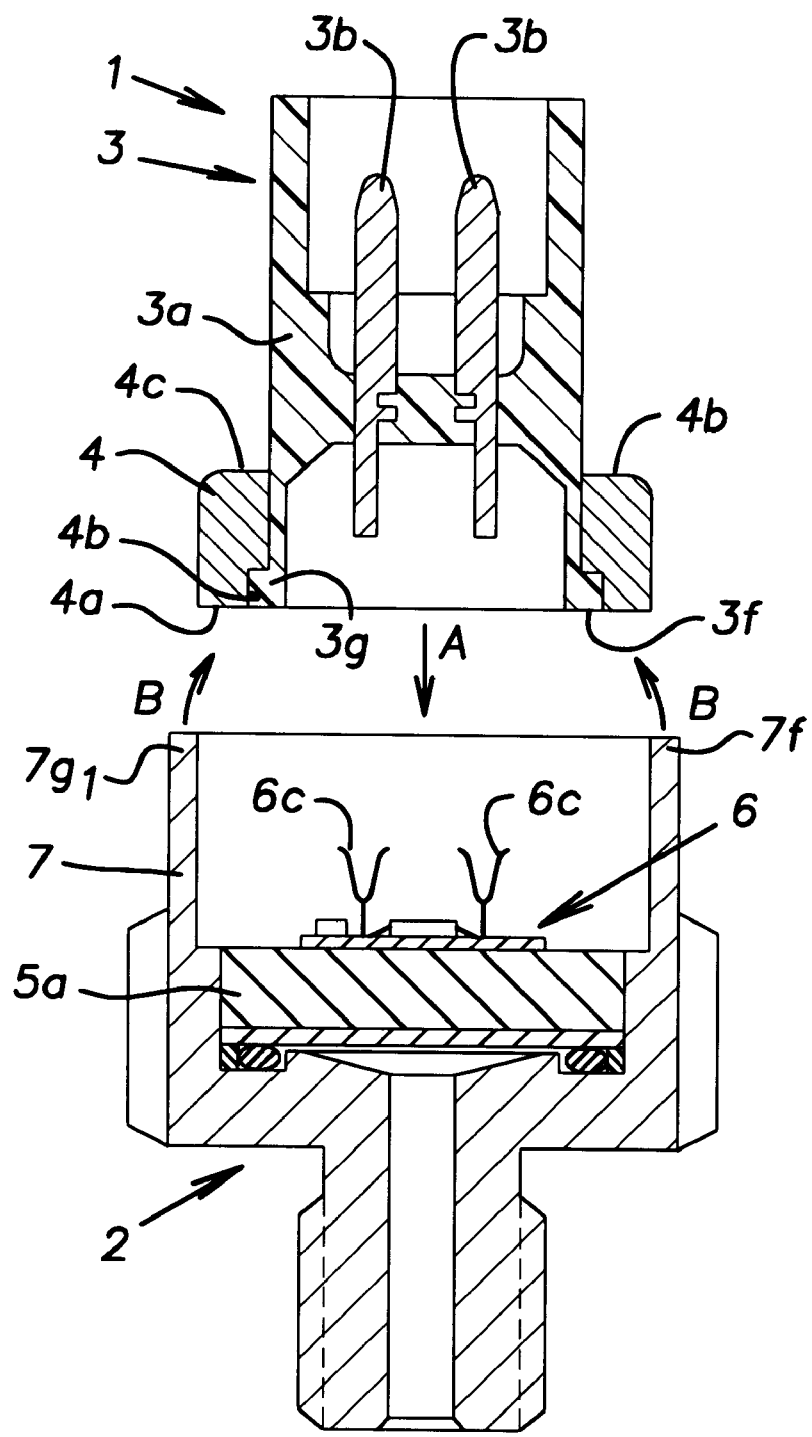
FIG. 3 is an exploded sectional view of the pressure sensor module shown in FIG. 1.

Now, the manner of assembling of the pressure sensor module of the illustrated embodiment thus constructed will be described hereinafter. First, as shown in FIG. 3 which is an exploded sectional view of the pressure sensor module, the annular support 4 is fitted on the connector body 3a so as to engagedly fit the flange 3g of the connector 3 in the annular engagement recess 4b of the annular support 4, to thereby assemble the connector assembly 1. Then, the connector assembly 1 is received in the housing 7 of the pressure sensor assembly 2 in a direction indicated at an arrow A in FIG. 3. This permits the one end surface 4a of the annular support 4 and the end surface 3f of the base section 3c1 of the connector body 3a to be abutted against the pressure non-sensing side insulating substrate 5a of the pressure sensing element 5 and fitting between the connections 6c of the circuit board 6 and the terminal members 3b of the connector 3 to be carried out. Thereafter, the engagement section 7g1 of the housing 7 is subject to caulking or curling in a direction indicated at an arrow B so as to surround an outer edge of the other end surface 4c of the annular support 4, to thereby fixedly mount the connector assembly 1 on the pressure sensor assembly 2, resulting in the assembling being completed.

Figure 4:
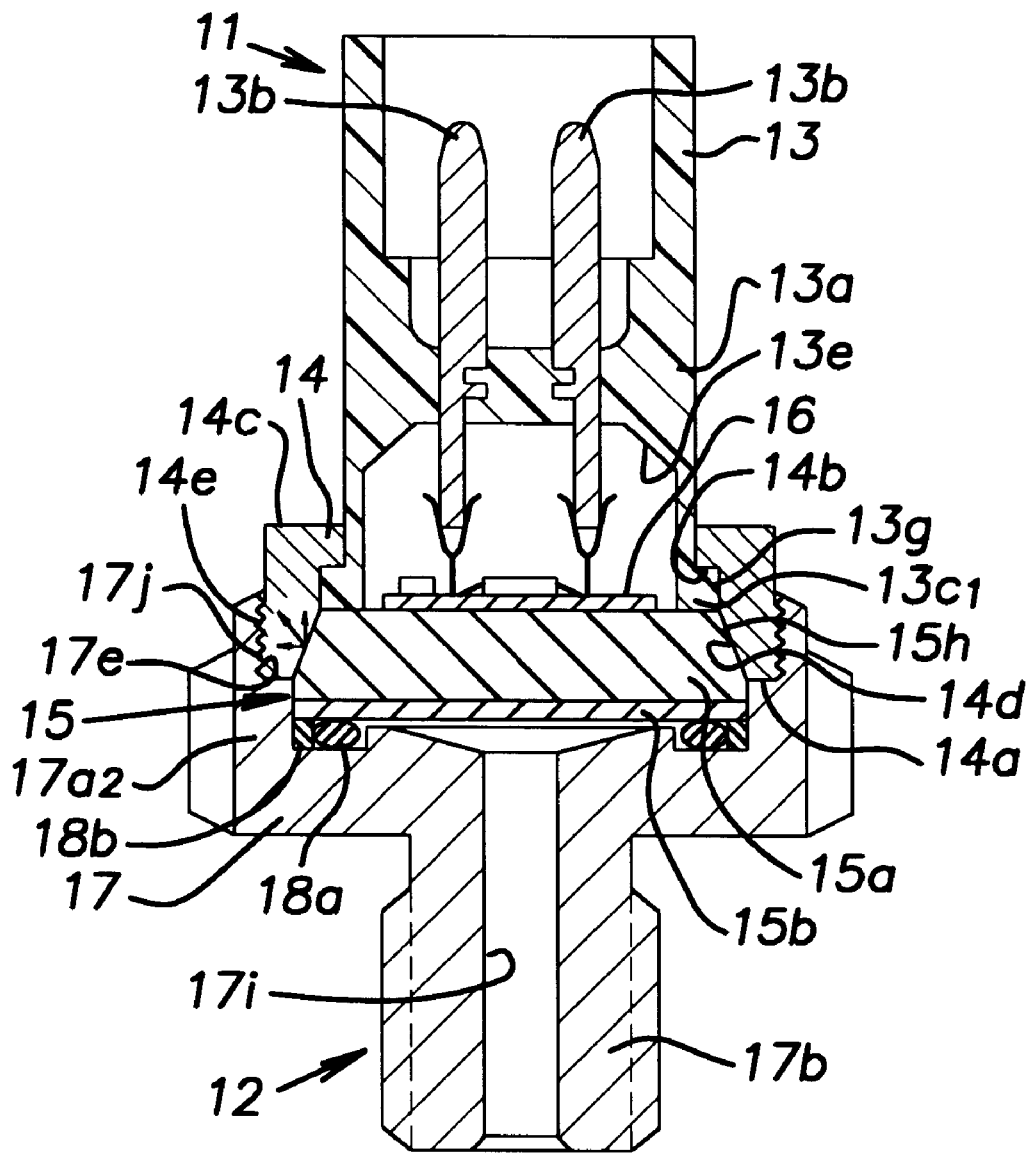
FIG. 4 is a sectional view showing a structure of another embodiment of a pressure sensor module according to the present invention.

FIG. 4 is a sectional view showing a structure of another embodiment of a pressure sensor module according to the present invention. The illustrated embodiment is different from the embodiment described above with reference to FIGS. 1 to 3 in that a second engagement structure (an engagement structure of an annular support 14 and a housing 17) is constituted by threaded engagement. The remaining part of the illustrated embodiment may be constructed in substantially the same manner as the embodiment of FIGS. 1 to 3. Therefore, in connection with the illustrated embodiment, like reference numerals with the prefix 10 are used to refer to parts or elements corresponding to those in FIGS. 1 to 3, so that description on the parts will be substantially deleted. In the illustrated embodiment, the housing 17 has a support receiving section 17e (a peripheral wall 17a2) formed on an inner periphery thereof with female threads 17j and the annular support 14 is formed on an outer periphery thereof with male threads 14e threadedly engaged with the female threads 17j. Such threaded engagement between the female threads 17j and the male threads 14e constitutes a second engagement structure, to thereby mount a connector assembly 11 on a pressure sensor assembly 12. The annular support 14 is formed on an inner periphery thereof with an annular engagement recess 14b engaged with a flange 13g of a connector 13, as well as a tapered section 14d contiguous to the recess 14b. The tapered section 14d is formed into a frust-conical shape obtained by cutting a head increased in diameter toward an end surface 14a. Also, a pressure sensing element 15 includes a pressure non-sensing side insulating substrate 15a, which is formed on an outer periphery thereof with a tapered section 15h of a frust-conical shape increased in diameter toward a pressure sensing side insulating substrate 15b. When the tapered section 14d of the annular support 14 and the tapered section 15h of the pressure sensing element 15 are contacted with each other while being aligned with each other, a contact area between the annular support 14 and the pressure sensing element 15 is increased, to thereby relieve stress occurring in the pressure sensing element 15. In other words, such an increase in contact area permits force applied to a unit area to be reduced, leading to an increase in pressure resistance thereof, when force applied to the pressure sensing element 15 is borne by the annular support 14. Also, force applied from the pressure sensing element 15 to the annular support 14 is directed in a direction perpendicular to an inclined surface of the tapered section and then divided into a component directed toward the connector 13 and a component for expanding the annular support 14. This results in force which acts to shear the engagement section (force directed toward the connector 13) being reduced in magnitude, leading to an increase in pressure resistance of the engagement section.

Figure 5:
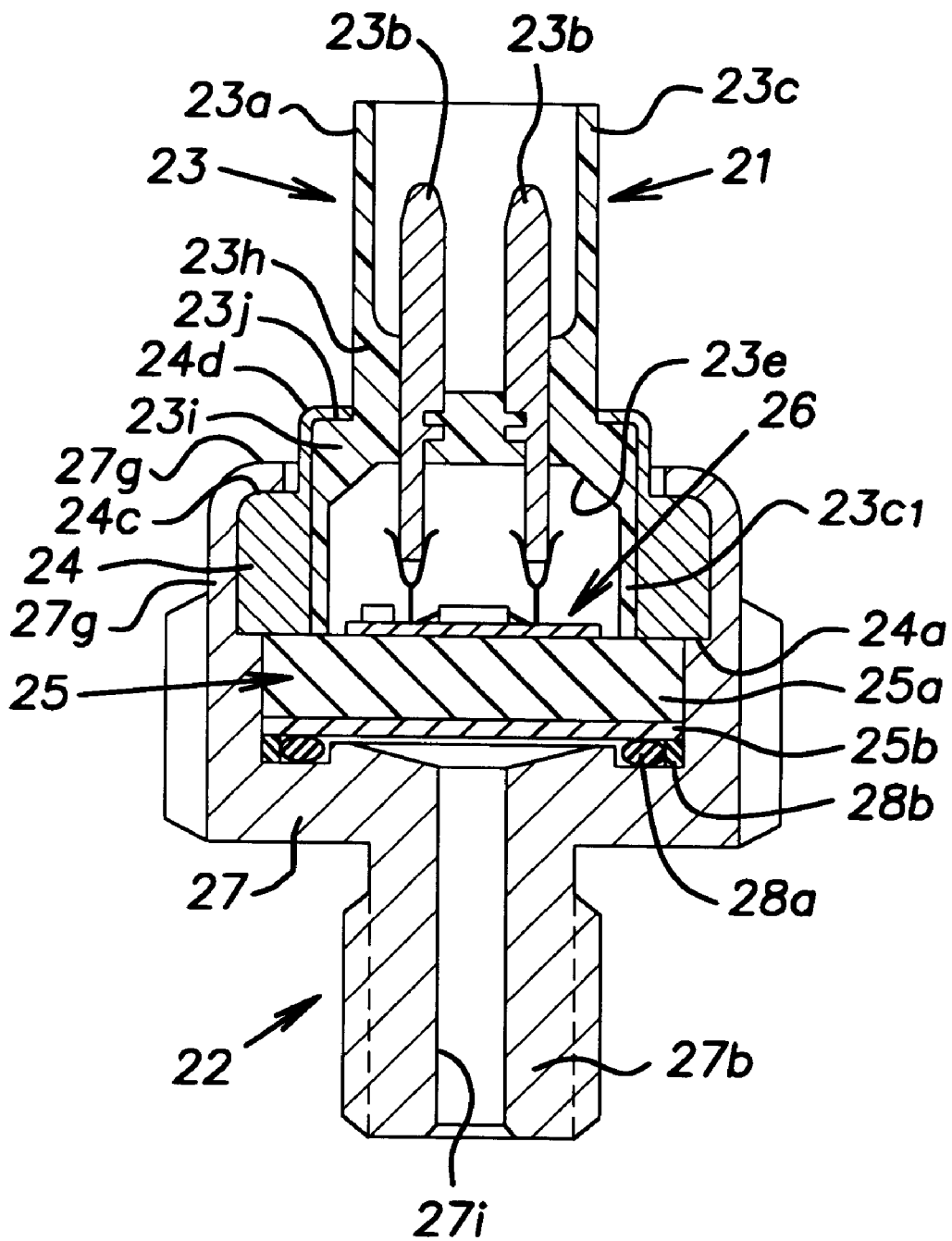
FIG. 5 is a sectional view showing a structure of a further embodiment of a pressure sensor module according to the present invention.

FIG. 5 is a sectional view showing a further embodiment of a pressure sensor module according to the present invention. A pressure sensor module of the illustrated embodiment is constructed in substantially the same manner as the embodiment of FIGS. 1 to 3, except a first engagement structure (an engagement structure for preventing detachment of a connector body 23a). Thus, in connection with the illustrated embodiment, like reference numerals with the prefix 20 are used to refer to parts or elements corresponding to those in FIGS. 1 to 3, so that description on the parts will be substantially deleted. In the illustrated embodiment, a connector body 23a is formed at a portion 23h thereof (a mated connector fit section thereof) in which a connector to be mated therewith or a mated connector is fitted into outer dimensions smaller than those of a base section 23i thereof and an annular support 24 is integrally provided on the other end surface thereof with an engagement section 24d which permits the mated connector fit section 23h to pass therethrough but is engaged with a boundary section 23j formed between the base section 23i and the mated connector fit section 23h. In the illustrated embodiment, in order that the first engagement structure prevents detachment of the connector body, the connector body 23a is fitted in the annular support 24, resulting in the annular support 24 being mounted on a connector 23. The illustrated embodiment eliminates a necessity of forming the connector 23 with any flange, so that an end of the connector 23 may be reduced in outer dimensions. This permits a contact area between the annular support 24 and a pressure sensing element 25 to be increased, to thereby reduce force applied to the connector 23.

In each of the above-described embodiments, connection between the terminal members of the connector and the connections of the circuit board may be carried out in any suitable manner. For example, it may be carried out by forming each of the connections of the circuit boards into a configuration of a female terminal structure in which one end of the terminal member is fitted and fittedly connecting the female terminal structure and terminal member to each other.

The embodiments described above each are so constructed that the connector is contacted with the pressure sensing element, the circuit board is surrounded by the connector, the annular support formed of a material hard to be deformed under a high pressure as compared with the connector body is engaged with the connector body, and the annular support and housing are engaged with each other. Such construction causes force of increased magnitude to be applied to the engagement between the annular support and the housing but effectively restrains force of increased magnitude from being applied to the connector body, when a high pressure is applied to the pressure sensing element.Thus, the embodiments prevents detachment of the connector, as well as breakage thereof due to application of a high pressure thereto.

Figure 6:
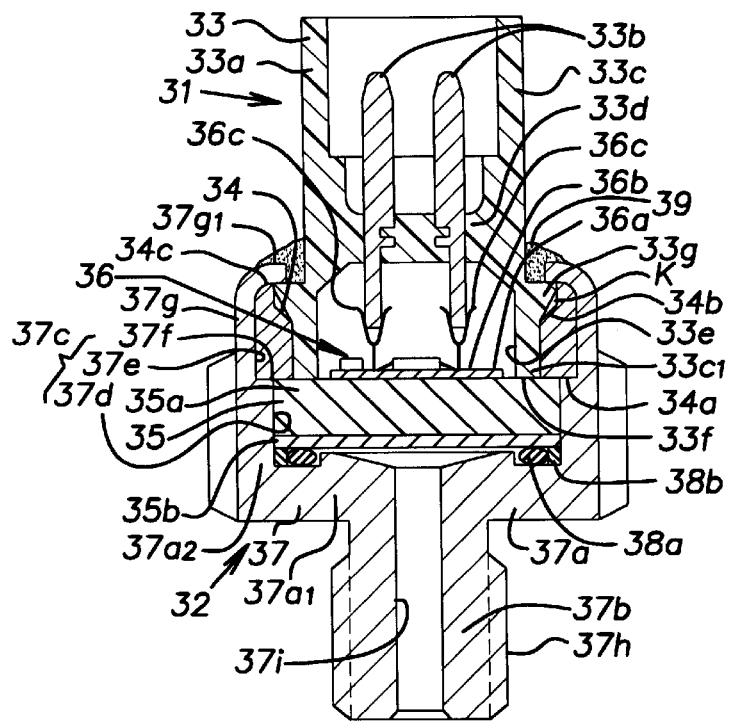
FIG. 6 is a sectional view showing a structure of still another embodiment of a pressure sensor module according to the present invention.

In each of the embodiments described above, the first engagement structure for preventing detachment of the connector is constituted by engagement between the connector body and the annular support. However, the first engagement structure is not limited to such construction. FIG. 6 shows still another embodiment of a pressure sensor module according to the present invention, in which a first engagement structure is constructed in a manner different from that of each of the above-described embodiments. In FIG. 6, like reference numerals with the prefix 30 are used to refer to parts or elements corresponding to those in FIGS. 1 to 3, so that description on the parts will be substantially deleted. The illustrated embodiment is constructed in a manner different from the embodiment shown in FIGS. 1 to 3 in that an engagement section 37g provided on a housing 37 and an annular flange 33g provided on a base section 33c1 of a connector body 33a are engaged with each other to provide a first engagement structure.

Figure 7:
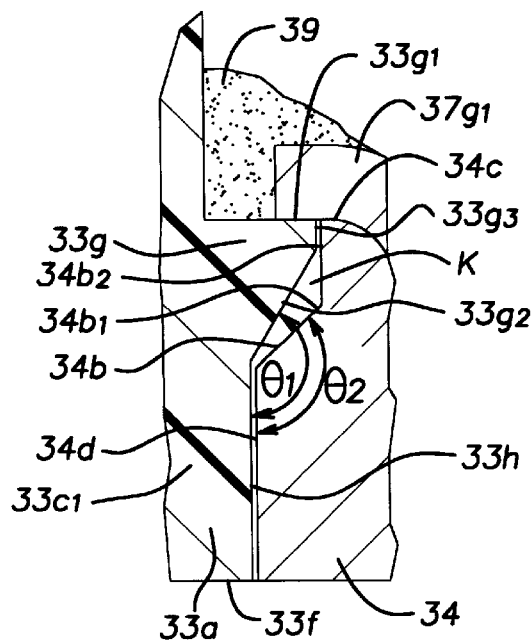
FIG. 7 is a fragmentary enlarged sectional view of the pressure sensor module shown in FIG. 6.

In the illustrated embodiment, a cylinder 33c is integrally provided on an outer periphery of an end of the base section 33c1 thereof opposite to an end surface 33f thereof with an annular projection or flange 33g so as to project or extend outwardly in a radial direction thereof. The flange 33g, as shown in FIG. 7 which is a fragmentary enlarged sectional view of the pressure sensor module, is formed so as to be gradually reduced in thickness toward an outer periphery thereof (or as it recedes from the base section 33c1). The flange 33g has an annular outer end surface 33g1 formed on a side thereof which is not opposite to an annular support 34 (or a side thereof opposite to the end surface 33f). Also, the flange 33g has a frustconical tapered surface 33g2 and a cylindrical end surface 33g3 coaxial with the cylinder 33c formed on a side thereof opposite to the annular support 34. Such construction of the flange 33g permits mechanical strength of a root or joint portion of the flange 33g with respect to the connector 33a to be significantly increased. Thus, even when force is applied to the root portion of the flange 33g with respect to the connector body 33a during curling of an engagement section 37g1 or while a high pressure is applied to a pressure sensing element 35, the root portion is prevented from being cracked. The flange 33g of the base section 33c1 of the cylinder 33c is also formed at a lower portion thereof with a cylindrical outer peripheral surface 33h in a manner to be coaxial with the cylinder 33c. The outer end surface 33g1 of the flange 33g of the connector body 33a is kept projected beyond the other end surface 34c of the annular support 34 before the engagement section 37g1 is subject to curling. In the illustrated embodiment, the outer end surface 33g1 is projected by a distance of 0.2 mm. Such arrangement ensures firm fixing of the connector body 33a in the housing 37 even when a variation in working or processing accuracy somewhat occurs during the curling.

The annular support 34 is arranged so as to surround an outer periphery of the base section 33c1 of the connector body 33a so that one end surface 34a thereof is contacted with the pressure sensing element 35 outside the base section 33c1 of the connector body 33a. The annular support 34 has an opening defined in the other end surface 34c, which opening is formed with an annular fit recess or annular step 34b in which the flange 33g of the connector 33 is fitted. The annular step 34b, as detailedly shown in FIG. 7, is constituted by a frust-conical tapered surface 34b1 facing the flange 33g and a cylindrical end surface 34b2 facing the cylindrical end surface 33g3 of the flange 33g so that a gap K is defined between the annular step 34b and the flange 33g of the connector 33. The gap K is formed into a configuration and dimensions which permit deformation of the flange 33g during curling of the housing 37 which will be more detailedly described hereinafter. Also, the annular step 34b of the annular support 34 is formed at a lower portion thereof with a cylindrical inner peripheral surface 34d in a manner to face the outer peripheral surface 33h of the cylinder 33c. The illustrated embodiment is so constructed that a gap of 0.1 mm is formed between the cylindrical end surface 33g3 of the flange 33g and the cylindrical end surface 34b2 of the annular step 34b and between the cylindrical surface 33h of the connector body 33a and the inner peripheral surface 34d of the annular support 34. Also, for the purpose of formation of the gap K, an angle a+1 between the outer peripheral surface 33h of the connector body 33a and the tapered surface 33g2 is set to be 150 degrees and an angle a+2 between the inner peripheral surface 34d of the annular support 34 and the tapered surface 34b1 is set to be 135 degrees. Further, in the illustrated embodiment, a seal layer 39 is arranged so as to extend between the engagement section 37g1 and the connector body 33a. The seal layer 39 is made of a seal material such as urethane resin, epoxy resin or the like.

When detachment of the connector body 33 from the housing 37 is to be prevented through engagement between the engagement section 37g1 of the housing 37 and the connector body 33a as in the illustrated embodiment, an increase in length of the engagement section 37g1 to be curled causes an increase in slippage between a surface of the engagement section 37g1 and a die for the curling and an increase in force applied to the engagement section 37g1. This leads to a problem that the surface of the engagement section 37g1 is readily damaged. In the present invention, the flange 33g is arranged on the outer periphery of the base section 33c1 of the connector body 33a and the engagement section 37g1 of the housing 37 is curled so as to surround the outer edge of the outer end surface 33g1 of the flange 33g, so that the engagement section 37g1 may be reduced in length by an amount corresponding to a distance of outward projection of the flange 33g from the base section 33c1 of the connector body 33a. This reduces damage to the surface of the engagement section 37g1 during the curling. In particular, this exhibits a significant advantage when the surface of the engagement section 37g1 is plated.

In the illustrated embodiment, not only the connector body 33a and pressure sensing element 35 are contacted with each other, but curling is carried out on the connector body 33a as well. However, when a high pressure is applied to the pressure sensing element 35, the pressure is commonly borne by both annular support 34 and connector body 33a, and the engagement section 37g1 of the housing 37 is contacted with both annular support 34 and connector body 33a, so that force of magnitude sufficient to cause damage to the connector body 33a is prevented from being applied to the connector body 33a. This effectively prevents detachment of the connector 33a, as well as breakage of the connector 33a due to application of a high pressure thereto. Now, this will be somewhat more detailedly described hereinafter. A large part of the engagement section 37g1 of the housing 37 is arranged so as to surround the outer edge of the annular support 34, so that the connector body 33a is merely enclosed at the outer edge of the flange 33g thereof with the engagement section 37g1. Thus, force applied to the engagement section 37g1 due to application of a pressure of an increased level to the pressure sensing element 35 is commonly borne by the annular support 34 and the flange 33g of the connector body 33a, to thereby prevent force of significant magnitude from being applied to the flange 33g. Also, the annular support 34 is contacted with the pressure sensing element 35 outside the base section 33c1 of the connector body 33a, so that force exerted by the pressure sensing element 35 is borne by both annular support 24 and connector body 33a. Thus, when a contact area between the annular support 34 and the pressure sensing element 35 is increased to a degree, force applied to the connector body 33a may be reduced.

Mere formation of the annular step 34b in the annular support 34 for fitting of the flange 33g therein possibly causes the flange 33g of the connector body 33a to be compressed through the engagement section 37g1 of the housing 37 and the annular support 34 by force applied during the curling, resulting in cracks occurring in the flange 33g. Compression of the flange 33g by the engagement section 37g1 of the housing 37 and the annular support 34 likewise occurs also when an increased pressure is applied to the pressure sensing element 35; so that cracks and/or strain likewise possibly occur therein. In view of the fact, the illustrated embodiment is so constructed that the gap K is formed between the annular step 34b of the annular support 34 and the annular flange 33g of the connector-body 33a, to thereby provide a so-called "relief" which prevents the flange 33g from being compressed when force is applied to the flange 33g. The gap K is formed so as to permit deformation of the annular flange 33g during the curling. In this connection, undesirable contact between the flange 33g and the annular step 34b may possibly partially occurs depending on working or processing accuracy irrespective of formation of the gap K therebetween. Nevertheless, such provision of the gap K therebetween prevents such undesirable contact therebetween from substantially adversely affecting the pressure sensor module.

Figure 8:
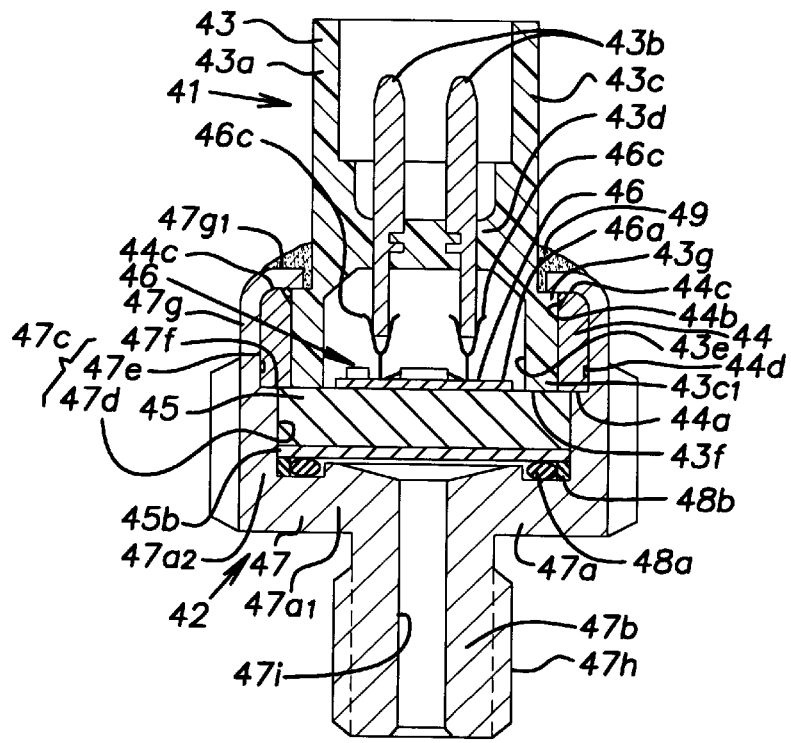
FIG. 8 is a sectional view showing a structure of yet another embodiment of a pressure sensor module according to the present invention.
Figure 9:
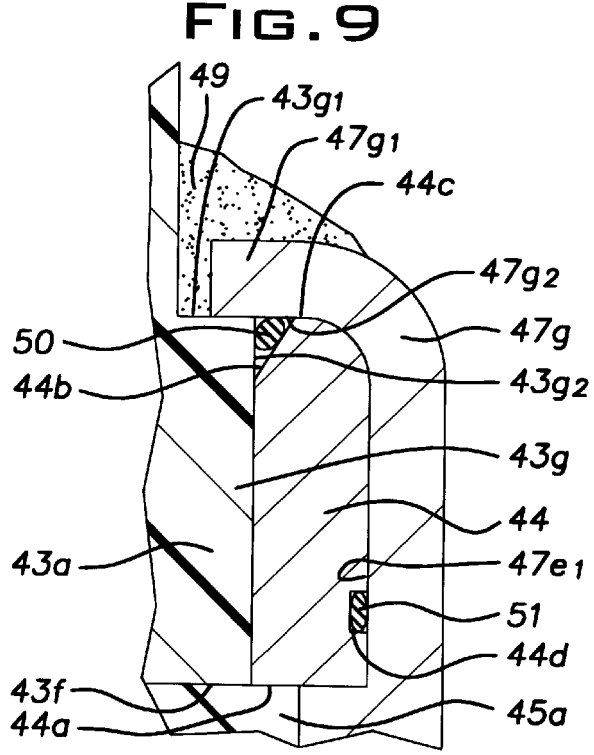
FIG. 9 is a fragmentary enlarged sectional view of the pressure sensor module shown in FIG. 8.

Also, in the illustrated embodiment, as described above and shown in FIGS. 6 and 7, the seal layer 39 which is formed of synthetic resin is arranged so as to extend between the connector 33a and the engagement section 37g1 of the housing 37 in order to prevent water from intruding into the pressure sensor module. The seal layer 39 thus formed of synthetic resin exhibits a sealing function increased in reliability to a degree. However, such formation of the seal layer 39 requires application of the synthetic resin and a certain length of time for curing it, to thereby fail to increase efficiency in manufacturing of the pressure sensor module. Also, the seal layer made of synthetic resin singly fails to maintain an increased sealing function over a long period of time. FIG. 8 is a sectional view showing yet another embodiment of a pressure sensor module according to the present invention which is constructed so as to solve such a problem. FIG. 9 is an enlarged view showing an essential part of the pressure sensor module of the illustrated embodiment. In FIGS. 8 and 9, like reference numerals with the additional prefix 10 are used to refer to parts or elements corresponding to those indicated at reference numerals with the prefix 30 in FIGS. 6 and 7, so that description on the parts will be substantially deleted.

In the pressure sensor module of the illustrated embodiment, an annular projection or shoulder 43g is provided integrally with a connector body 43a in a manner to surround an outer periphery of a base section 43c1 of a cylinder 43c of the connector body 43a and project outwardly in a radial direction thereof. The shoulder 43g, as enlargedly detailedly shown in FIG. 9, is formed so as to extend to a lower portion of the base section 43c1 of the connector body 43a so that a lower end of the shoulder 43g is contacted with a pressure non-sensing side insulating substrate 45a, and has a distal end surface 43f, as well as an annular outer end surface 43g1 formed on a side thereof opposite to the distal end surface 43f thereof. The outer end surface 43g1 of the shoulder 43g of the connector body 43a is formed so as to project beyond the other end surface 44c of an annular support 44 before curling. The annular support 44 is formed on an inner peripheral side edge thereof positioned on a side of the other end surface 44c thereof with an annular tapered surface 44b. The annular support 44 is formed on an outer peripheral surface thereof in proximity to the pressure non-sensing side insulating substrate 45a with an annular recess 44d in a manner to continuously extend in a circumferential direction thereof.

Among the base section 43c1 of the connector body 43a, the annular support 44 and the engagement section 47g1 of the housing 47 is arranged a ring-like packing 50 in a manner to be contacted with the tapered surface 44b of the annular support 44, an outer surface 43g2 (an outer surface of the shoulder) of the base section of the connector body 43a and an inner surface 47g2 of the engagement section 47g1 of the housing 47. The ring-like packing 50 is made of nitrile rubber and functions to seal a gap formed between the engagement section 47g1 of the housing 47 and the base section of the connector body 43a. Also, the annular recess 44d of the annular support 44 has an auxiliary ring-like packing 51 fitted therein. The auxiliary ring-like packing 51 is likewise made of nitrile rubber, like the ring-like packing 50. The auxiliary ring-like packing 51 is arranged between the outer peripheral surface of the annular support 44 and a wall 47e1 of the housing 47 surrounding a support receiving section 47e, to thereby prevent water which the ring-like packing 50 failed to prevent from intruding between the annular support 44 and the housing 47 from further intruding into the pressure sensor module.

In the illustrated embodiment, when the pressure sensor module is to be assembled, the ring-like packing 50 is compressed by the tapered surface 44b of the annular support 44, the outer surface 43g2 of the base section (the outer surface of the shoulder) of the connector body 43a and the inner surface 47g2 of the engagement section 47g1 of the housing 47. After the curling, urethane resin or epoxy resin is charged between the connector body 43a and the engagement section 47g1 of the housing 47, to thereby form a seal layer 49. Such formation of the seal layer 49 in a manner to extend between the connector body 43a and the engagement section 47g1 of the housing 47 more effectively prevents water from intruding into the pressure sensor module through the gap between the engagement section of the housing and the base section of the connector body 43a, resulting in the pressure sensor module exhibiting significantly increased reliability.

In the illustrated embodiment, as described above, the ring-like packing 50 is arranged so as to be contacted with the tapered surface 44b of the annular support 44, the outer surface 43g2 of the base section (the outer surface of the shoulder) of the connector body 43a and the inner surface 47g2 of the engagement section 47g1 of the housing 47. However, sealing by the ring-like packing 50 is merely required for sealing the gap formed between the engagement section 47g1 of the housing 47 and the base section of the connector body 43a. Therefore, for example, a like ring-like packing may be arranged between the base section of the connector body 43a and the engagement section 47g1 of the housing 47. In this instance, either the base section of the connector body 43a or the engagement section 47g1 of the housing 47 may be formed with an annular recess in which the ring-like packing is arranged.

FIG. 10 is a fragmentary enlarged view showing engagement between a connector body and a housing in a still further embodiment of a pressure sensor module according to the present invention which is also a modification of the embodiment shown in FIGS. 8 and 9. In FIG. 10, like reference numerals with the prefix 100 are used to refer to parts or elements corresponding to those indicated at reference numerals with the prefix 40 in FIGS. 8 and 9. In the illustrated embodiment, a gap formed between a base section of a connector body 143a and an annular support 144 is sealed by a first ring-like packing 150. More specifically, the base section of the connector body 143a is formed with an annular flange 143g and the annular support 144 is formed with an annular step 144b which cooperates with the flange 143g to define therebetween an annular packing fit space S continuously extending in a circumferential direction thereof. Then, the first ring-like packing 150 is fitted in the annular packing fit space S. Also, the annular support 144 is formed on an outer peripheral surface thereof with an annular recess 144d in a manner to continuously extend in the circumferential direction thereof, in which an auxiliary ring-like packing 151 acting as a second ring-like packing is fitted. Such construction of the illustrated embodiment facilitates positioning of the first ring-like packing 150. Also, it permits the first ring-like packing 150 to be firmly interposedly arranged between the flange 143g and the step 144b, so that sealing characteristics may be further enhanced. The ring-like packing eliminates application of synthetic resin and a period of time required for curing the resin as in such formation of the synthetic resin into the seal layer as described above. Further, it readily provides a seal structure which prevents water from intruding into the pressure sensor module through a gap between an engagement section 147g1 of a housing 147 and the base section of the connector body 143a.

In each of the embodiments shown in FIGS. 8 to 10, the seal layer 49 or 149 which is made of urethane resin is arranged so as to extend between the connector 43a or 143a and the engagement section 47g1 or 147g1 of the housing 47 or 147. However, it is not necessarily required to arranged such a seal layer.

INDUSTRIAL APPLICATION

The present invention eliminates a necessity of arranging any metal support substrate between the pressure sensing element and the connector, to thereby permit a thickness or height of the whole pressure sensor module to be reduced by an amount corresponding to the elimination. Also, no metal support substrate exists under the circuit board, therefore, flowing of static electricity through such a support board to the circuit board is eliminated. Further, the annular support is kept from being wholly contacted with the pressure sensing element, to thereby prevent force from being locally applied to the pressure sensing element even when the pressure sensing element is warped, resulting in preventing breakage of the pressure sensing element.

We claim:

1. A pressure sensor module comprising:
   a pressure sensing element having a pressure sensing side insulating substrate and a pressure non-sensing side insulating substrate arranged opposite to each other and respectively provided on surfaces thereof opposite to each other with facing electrodes, to thereby detect a variation in pressure based on a variation in capacity between said facing electrodes;
   a connector including a connector body which is made of an insulating material, provided with a plurality of terminal members to which terminals of a connector mated therewith are connected and formed at a base section thereof with a board receiving recess for receiving a circuit board therein;
   an annular support made of a material exhibiting mechanical strength higher than that of said connector body and fitted on said base section of said connector body to contact one end surface thereof with said pressure non-sensing side insulating substrate outside said base section of said connector body; and
   a housing made of metal and including a receiving chamber for receiving said pressure sensing element, said base section of said connector body and said annular support therein, a high-pressure fluid feed passage arranged so as to communicate with said receiving chamber to permit measured fluid for acting a pressure on a pressure sensing surface of said pressure sensing side insulating substrate to be fed therethrough, and an engagement section engaged with said annular support;
   said connector body being contacted on an end surface thereof at which an opening of said substrate receiving recess of said base section thereof is surroundedly defined with said pressure non-sensing side insulating substrate;
   said base section of said connector body, said annular support and said engagement section of said housing being constructed so as to provide a first engagement structure for preventing said connector body from being detached from said annular support in a direction away from said pressure non-sensing side insulating substrate and a second engagement structure for preventing said annular support from being detached from said pressure non-sensing side insulating substrate.

2. A pressure sensor module as defined in claim 1, characterized in that said housing is formed with a support step for supporting said annular support thereon; and
   said annular support is contacted with said pressure non-sensing side insulating substrate while being supported on said support step.

3. A pressure sensor module as defined in claim 1, characterized in that said base section of said connector body is integrally provided on an outer periphery of an end thereof with a projection in a manner to project outwardly therefrom; and said opening of said one end surface of said annular support is formed with engagement recess in which said projection is engagedly fitted, so that engagement between said projection and said engagement recess provides said first engagement structure.

4. A pressure sensor module as defined in claim 1, characterized in that said connector body includes said base section and a mated connector fit section in which said mated connector is fitted;

said mated connector fit section is formed into outer dimensions smaller than those of said base section;

said annular support is integrally provided on the other end surface thereof with an engagement section which permits said mated connector fit section to pass therethrough and is engaged with a boundary section defined between said base section and said mated connector fit section; and engagement between said boundary section and said engagement section provides said first engagement structure.

5. A pressure sensor module as defined in claim 2, characterized in that said receiving chamber of said housing includes a sensing element receiving section for receiving said pressure sensing element therein and a support receiving section for receiving said annular support therein arranged in a manner to be contiguous to said sensing element receiving section;

said support step is formed between said sensing element receiving section and said support receiving section;

said engagement section is formed by extending a wall surroundingly defining said support receiving section beyond the other end surface of said annular support received in said support receiving section;

said engagement section is curled so as to surround an outer periphery of the other end surface of said annular support; and said second engagement structure is formed by engagement between said engagement section curled and the other end surface of said annular support.

6. A pressure sensor module as defined in claim 1, characterized in that said base section of said connector body is integrally provided on an outer periphery thereof with an annular flange so as to extend outwardly therefrom;

said annular support is formed at an opening of the other end surface thereof with an annular step in which said flange is fitted;

said receiving chamber of said housing includes a sensing element receiving section for receiving said pressure sensing element therein and a support receiving section for receiving said annular support therein arranged in a manner to be contiguous to said pressure sensing element receiving section;

said engagement section is formed by extending a wall surroundingly defining said support receiving section beyond the other end surface of said annular support received in said support receiving section;

said engagement section is curled so as to surround said the other end surface of said annular support and an outer edge of an outer end surface of said base section of said annular flange of said connector body positioned opposite to said end surface;

a gap is defined between said annular step of said annular support and said annular flange of said connector body; and said engagement section curled and said annular flange cooperate with each other to provide said first engagement structure and said engagement section curled and said the other end surface of said annular support cooperate with each other to provide said second engagement structure.

7. A pressure sensor module as defined in claim 1, characterized in that said base section of said connector body is formed thereon with an annular shoulder so as to surround an outer periphery of said base section;

said receiving chamber of said housing includes a sensing element receiving section for receiving said pressure sensing element therein and a support receiving section for receiving said annular support therein arranged in a manner to be contiguous to said pressure sensing element receiving section;

said engagement section is formed by extending a wall surroundingly defining said support receiving section beyond the other end surface of said annular support received in said support receiving section;

said engagement section is curled so as to surround the other end surface of said annular support and an outer edge of said annular shoulder of said connector body; and said engagement section curled and said annular shoulder cooperate with each other to provide said first engagement structure and said engagement section curled and said the other end surface of said annular support cooperate with each other to provide said second engagement structure.

8. A pressure sensor module as defined in claim 2, characterized in that said receiving chamber of said housing includes a sensing element receiving section for receiving said pressure sensing element therein and a support receiving section for receiving a part of said annular support therein arranged in a manner to be contiguous to said sensing element receiving section;

said support step is formed between said sensing element receiving section and said support receiving section;

said support receiving section is formed on an inner periphery thereof with female threads, to thereby provide said engagement section;

said part of said annular support is formed on an outer periphery thereof with male threads with which said female threads are engaged; and engagement between said female threads and said male threads provides said second engagement structure.

9. A pressure sensor module comprising:

a pressure sensing element having a pressure sensing side insulating substrate and a pressure non-sensing side insulating substrate arranged opposite to each other and respectively provided on surfaces thereof opposite to each other with facing electrodes, to thereby detect a variation in pressure based on a variation in capacity between said facing electrodes;

a connector including a connector body which is made of an insulating material and includes a plurality of terminal members to which terminals of a connector mated therewith are connected; and a housing made of metal and including a receiving chamber for receiving said pressure sensing element and a base section of said connector body therein, a high-pressure fluid feed passage arranged so as to communicate with said receiving chamber to permit measured fluid for acting a pressure on a pressure sensing surface of said pressure sensing side insulating substrate to be fed therethrough, and an engagement section coupled to said base section of said connector body, characterized in that:

said base section of said connector body is contacted on a distal end surface thereof with said pressure non-sensing side insulating substrate;

an annular support which is contacted on one end surface thereof with said pressure non-sensing side insulating substrate outside said base section of said connector body is fitted on said base section of said connector body;

said base section of said connector body is integrally provided on an outer periphery thereof with an annular flange so as to project outwardly therefrom;

said annular support is formed at an opening of the other end surface thereof with an annular step in which said flange is fitted;

said receiving chamber of said housing includes a sensing element receiving section for receiving said pressure sensing element therein and a support receiving section for receiving said annular support therein arranged in a manner to be contiguous to said pressure sensing element receiving section;

said engagement section is formed by extending a wall surroundingly defining said support receiving section beyond the other end surface of said annular support received in said support receiving section;

said engagement section is curled so as to surround said the other end surface of said annular support and an outer edge of an outer end surface of said base section of said annular flange of said connector body positioned opposite to said distal end surface; and a gap is defined between said annular step of said annular support and said annular flange of said connector body.

10. A pressure sensor module comprising:

a pressure sensing element having a pressure sensing side insulating substrate and a pressure non-sensing side insulating substrate arranged opposite to each other and respectively provided on surfaces thereof opposite to each other with facing electrodes, to thereby detect a variation in pressure based on a variation in capacity between said facing electrodes;

a connector including a connector body made of an insulating material and including a plurality of terminal members electrically connected at one end thereof to a signal conversion circuit and at the other end thereof to terminals of a connector mated therewith and fixed by means of said insulating resin material;

a housing made of metal, having a surface plated, and including a receiving chamber for receiving said pressure sensing element, a circuit board on which said signal conversion circuit is formed and a base section of said connector body therein, a high-pressure fluid feed passage arranged so as to communicate with said receiving chamber to permit measured fluid for acting a pressure on a pressure sensing surface of said pressure sensing side insulating substrate to be fed therethrough, and an engagement section coupled to said base section of said connector body;

said connector body being formed on said base section thereof with a substrate receiving recess for receiving said circuit board including said signal conversion circuit therein and contacted on an end surface thereof at which an opening of said substrate receiving recess of said base section thereof is surroundedly defined with said pressure non-sensing side insulating substrate, said terminal members being positioned at said one end thereof in said substrate receiving recess;

said base section of said connector body being contacted at a distal end surface thereof with said pressure non-sensing side insulating substrate;

an annular support made of metal, contacted on one end surface thereof with said pressure non-sensing side insulating substrate outside said base section of said connector body and fitted on said base section of said connector body;

said base section of said connector body being integrally provided on an outer periphery of an end thereof positioned opposite to said distal end surface with an annular flange so as to extend outwardly therefrom;

said annual being formed at an opening of the other end surface thereof with an annular step in which said flange is fitted;

said receiving chamber of said housing including a sensing element receiving section for receiving said pressure sensing element therein and a support receiving section for receiving said annular support therein arranged in a manner to be contiguous to said sensing element receiving section;

a support step formed between said sensing element receiving section and said support receiving section for supporting said annular support thereon while being contacted with an outer edge of said one end surface of said annular support;

said engagement section being formed by extending a wall surroundingly defining said support receiving section beyond the other end surface of said annular support received in said support receiving section;

said engagement section being curled so as to surround said the other end surface of said annular support and an outer edge of an outer end surface of said base section of said annular flange of said connector body positioned opposite to said end surface; and a gap defined between said annular step of said annular support and said annular flange of said connector body so as to permit deformation of said annular flange during said curling.

11. A pressure sensor module as defined in claim 10, characterized in that said outer end surface of said annular flange of said connector body is projected beyond said the other end surface of said annular support prior to said curling.

12. A pressure sensor module as defined in claim 10, characterized in that said annular flange of said connector body is reduced in thickness as it recedes from said base section.

13. A pressure sensor module comprising:

a pressure sensing element having a pressure sensing side insulating substrate and a pressure non-sensing side insulating substrate arranged opposite to each other and respectively provided on surfaces thereof opposite to each other with facing electrodes, to thereby detect a variation in pressure based on a variation in capacity between said facing electrodes;

a connector including a connector body made of an insulating material and including terminal members to which terminals of a connector mated therewith are connected;

an annular support fitted on a base section of said connector body;

a housing made of metal and including a receiving chamber for receiving said pressure sensing element, said base section of said connector body and said annular support therein, a high-pressure fluid feed passage arranged so as to communicate with said receiving chamber to permit measured fluid for acting a pressure on a pressure sensing surface of said pressure sensing side insulating substrate to be fed therethrough, and an engagement section curled so as to surround an outer edge of an annular shoulder provided on said base section of said connector body so as to surround an outer periphery of said base section and an end surface of said annular support; and a ring-like packing for sealing a gap formed between said engagement section of said housing and said base section of said connector body, said ring-like packing being arranged between said base section of said connector body and said engagement section of said housing or among said base section of said connector body, said annular support and said engagement section of said housing.

14. A pressure sensor module as defined in claim 13, characterized in that said annular support is formed on an inner peripheral edge thereof opposite to said pressure sensing element with an annular tapered surface increased in diameter as it recedes from said pressure sensing element; and said ring-like packing is arranged so as to be contacted with said tapered surface, an outer surface of said base section of said connector body and an inner surface of said engagement section of said housing.

15. A pressure sensor module as defined in claim 13 or 14, characterized in that an auxiliary ring-like packing is arranged between an outer peripheral surface of said annular support and a wall of said housing.

16. A pressure sensor module as defined in claim 15, characterized in that said outer peripheral surface of said annular support is formed with an annular recess continuously extending in a circumferential direction thereof; and said auxiliary ring-like packing is fitted in said annular recess.

17. A pressure sensor module comprising:

a pressure sensing element having a pressure sensing side insulating substrate and a pressure non-sensing side insulating substrate arranged opposite to each other and respectively provided on surfaces thereof opposite to each other with facing electrodes, to thereby detect a variation in pressure based on a variation in capacity between said facing electrodes;

a connector including a connector body made of an insulating material and including terminal members to which terminals of a connector mated therewith are connected;

an annular support fitted on a base section of said connector body; and a housing made of metal and including a receiving chamber for receiving said pressure sensing element, said base section of said connector body and said annular support therein, a high-pressure fluid feed passage arranged so as to communicate with said receiving chamber to permit measured fluid for acting a pressure on a pressure sensing surface of said pressure sensing side insulating substrate to be fed therethrough, and an engagement section curled so as to surround an outer edge of an annular shoulder provided on said base section of said connector body and an end surface of said annular support; and a first ring-like packing arranged between said base section of said connector body and said annular support to seal a gap formed between said base section of said connector body and said annular support and a second ring-like packing arranged between said housing and said annular support to seal a gap formed between said housing and said annular support.

18. A pressure sensor module as defined in claim 17, characterized in that said annular shoulder formed on said base section of said connector body is constituted by an annular flange;

said annular support is formed with an annular step for forming an annular packing fit space continuously extending in a circumferential direction thereof between said annular support and said flange;

said first ring-like packing is fitted in said packing fit space;

said annular support is formed on an outer peripheral surface thereof with an annular recess continuously extending in the circumferential direction thereof; and said second ring-like packing is fitted in said annular recess.

19. A pressure sensor module as defined in claim 17, characterized in that a seal layer made of synthetic resin is formed so as to extend between said connector body and said engagement section of said housing.

* * * * *

UNITED STATES PATENT AND TRADEMARK OFFICE
CERTIFICATE OF CORRECTION

PATENT NO. : 5,932,808
DATED : August 3, 1999
INVENTOR(S) : Hayashi et al.

It is certified that error appears in the above-identified patent and that said Letters Patent is hereby corrected as shown below:

Column 5, Line 47, delete "A".

Column 10, line 43, delete "a+1" and insert --â+1--.

Column 10, line 45, delete "a+2" and insert --â+2--.

Signed and Sealed this

First Day of February, 2000

Attest:

Attesting Officer

Q. TODD DICKINSON

Acting Commissioner of Patents and Trademarks